United States Patent [19]

Mizuno

[11] Patent Number: 5,017,767
[45] Date of Patent: May 21, 1991

[54] IC CARD WITH METAL REINFORCING PLATES AND GROUNDING LEAD WIRE

[75] Inventor: Yutaka Mizuno, Hachioji, Japan

[73] Assignee: Fanuc Ltd., Minamitsuru, Japan

[21] Appl. No.: 329,781

[22] PCT Filed: Aug. 31, 1988

[86] PCT No.: PCT/JP88/00868

§ 371 Date: Mar. 22, 1989

§ 102(e) Date: Mar. 22, 1989

[87] PCT Pub. No.: WO89/01874

PCT Pub. Date: Mar. 9, 1989

[30] Foreign Application Priority Data

Aug. 31, 1987 [JP] Japan ................. 62-217345

[51] Int. Cl.⁵ ............... G06K 19/06; H05K 1/14
[52] U.S. Cl. ................... 235/492; 235/487; 361/399
[58] Field of Search ................. 435/487, 492; 361/392-395, 399; 439/76, 607

[56] References Cited

U.S. PATENT DOCUMENTS

| | | | |
|---|---|---|---|
| 3,372,310 | 3/1968 | Kantor | 361/392 |
| 4,386,388 | 5/1983 | Beun | 361/394 X |
| 4,758,689 | 7/1988 | Nakao et al. | 174/52 |
| 4,780,791 | 10/1988 | Morita et al. | 235/492 X |

FOREIGN PATENT DOCUMENTS 0233649 8/1987 European Pat. Off. .
2586886 3/1987 France .

*Primary Examiner*—Stuart S. Levy
*Assistant Examiner*—Steven M. duBois
*Attorney, Agent, or Firm*—Staas & Halsey

[57] ABSTRACT

An IC card having an integrated circuit sealed within which includes a case constructed of a card-shaped synthetic resin material and internally incorporating an integrated circuit board. The case has a recess defined in one end thereof and opposite surfaces. A connector portion is disposed on the recessed end of the case and has contact pins positioned within the recess for connecting the integrated circuit board to an external circuit. A reinforcing metal plate covers each of the opposite surfaces of the case, with each metal plate having an integral end portion bent into an L-shaped configuration toward an inlet region of the recess and covering relation to a portion of the connector portion around the inlet region of the recess. The integrated circuit board has a ground-connection point electrically connected to the reinforcing metal plates.

3 Claims, 2 Drawing Sheets

IC CARD WITH METAL REINFORCING PLATES AND GROUNDING LEAD WIRE

TECHNICAL FIELD

This invention relates to an IC card having an integrated circuit sealed within.

BACKGROUND ART

Cards in which a magnetic stripe serves as a memory medium are widely utilized as magnetic cards for cash cards and credit cards in on-line systems at banks and the like.

Though such magnetic cards are low in cost, they have a small memory capacity and there is the danger that stored data may be erased by an external magnetism. Accordingly, in recent years IC cards of large memory capacity have been developed in which data will not be affected by external magnetism.

An IC card of this type has an internal processor and memory composed of a CMOS-type integrated circuit. As shown in the perspective view of FIG. 3, the external shape of this IC card is defined by a card-shaped plastic case a formed of a plastic material, and the upper and lower surfaces thereof are each covered by a reinforcing metal plate b. One end face of the card-shaped case is provided with a connector portion c connected to associated equipment when data is written or read from the IC card.

The metal plates which protect the IC card are for preventing deformation and bending of the IC card body by reinforcing it. Since the plastic connector portion c at the end face is not covered by the metal plates b, there is the danger that the plastic case a forming the connector portion c will deform or bend if the IC card is inadvertently dropped on the floor or its end face struck against some object. Moreover, the CMOS-type integrated circuit accommodated within the IC card is susceptible to accumulations of static electricity, and the internal integrated circuit can be damaged by a discharge of static electricity to the connector portion particularly when the air is dry.

DISCLOSURE OF THE INVENTION

The present invention has been devised in order to solve the foregoing problems and its object is to provide an IC card in which a connector portion provided at an end face of the IC card is protected physically and against a discharge of static electricity by a metal plate.

In accordance with the present invention, there is provided an IC card having an integrated circuit sealed within, the IC card comprising a case constructed of a card-shaped synthetic resin material and internally incorporating an integrated circuit board, a connector portion provided on an end face of the case for connecting the integrated circuit board to an external circuit, and a reinforcing metal plate a surface of covering the case, an end portion of the metal plate being bent into an L-shaped configuration to cover both a portion of the end face having the connector portion and a surface of the case, and having a ground-connection point of the semiconductor integrated circuit connected to the metal plate.

Accordingly, the IC card of the present invention is such that the end portions of the metal plates on the upper and lower surfaces of the case are bent into an L-shaped configuration to cover the IC card from the corners of the end faces to the vicinity of the connector portion. This has the effect of protecting the IC card against external impact. In addition, since the ground-connection point of the internal integrated circuit is connected to the metal plates, this has the effect of protecting the integrated circuit since static electricity in the vicinity of the connector portion is discharged into the metal plates.

BEST MODE FOR CARRYING OUT THE INVENTION

Figure 1:
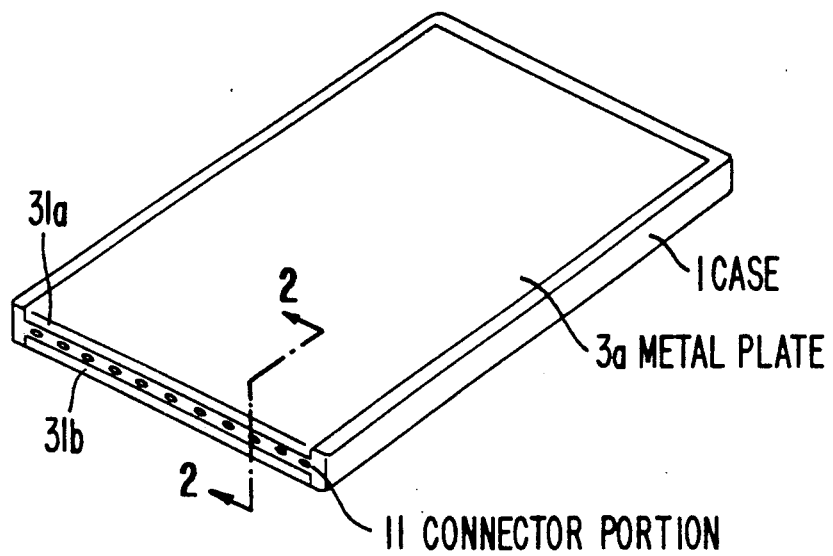
FIG. 1 is a perspective view illustrating an embodiment of the present invention.
Figure 2:
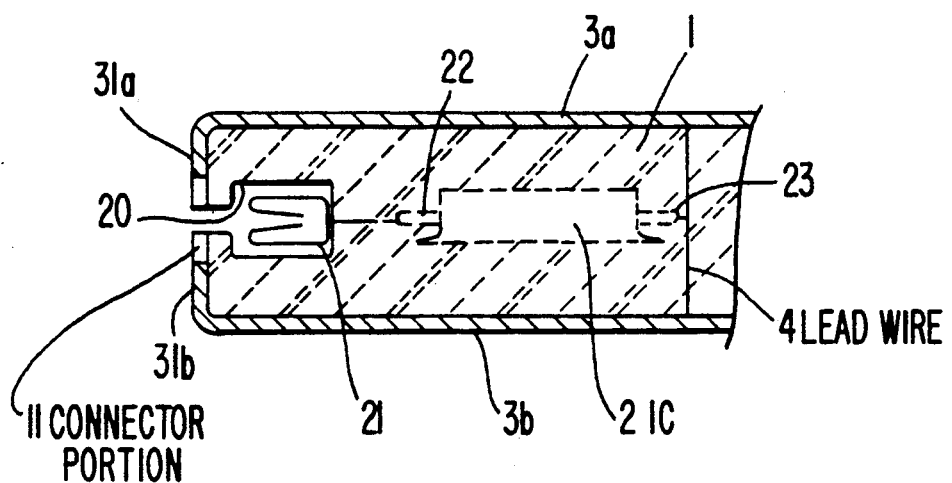
FIG. 2 is a sectional view taken along line 2—2 of FIG. 1.
Figure 3:
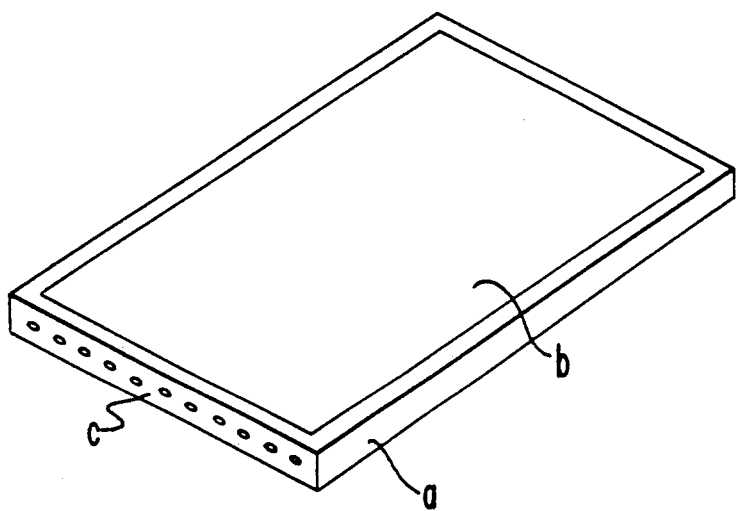
FIG. 3 is a perspective view illustrating an example of a conventional IC card.

An embodiment of the present invention will now be described in detail with reference to the drawings.

In the Figures, numeral 1 denotes a card-shaped case comprised of synthetic resin material. Imbedded in the case is a CMOS-type integrated circuit (IC) 2 which includes a processor and a memory.

Numeral 11 denotes a connector portion of the IC 2. The connector portion 11, which is for connecting the IC 2 to external equipment when writing/reading data, is provided on an end face of the case 1. A plurality of contact pins 21 are provided within a recess 20 in the connector portion 11 and are connected to prescribed terminals 22 of the IC 2.

Numerals 3a, 3b denote reinforcing plates. These reinforcing plates 3a, 3b are affixed to the upper and lower surfaces of the case 1 and have L-shaped end portions 31a, 31b at the connector portion 11 of the case. These L-shaped end portions 31a, 31b are bent so as to cover the IC card from the corners of the end face at which the connector portion 11 is provided to the vicinity of the connector portion.

Numeral 4 denotes a lead wire electrically connecting a ground-connection point 23 of the internal IC 2 to the metal plates 3a, 3b affixed to the upper and lower surfaces of the case 1. This is provided in close proximity to the contact pins 21 in such a manner that a discharge of static electricity produced in the vicinity of the connector portion 11 will be guided to the L-shaped end portions 31a, 31b provided on the respective metal plates 3a, 3b. Thus, external static electricity is prevented from being discharged to the IC 2 via the contact pins 21 by means of the metal plates 3a, 3b.

In accordance with the present embodiment thus constructed, the case 1 will not be deformed or damaged if the end face of the connector portion 11 is subjected to an impact, as when the IC card is inadvertently dropped. The reason is that the vicinity of the connector portion 11 which includes the corner of the end face of the card case is covered by the L-shaped end portions 31a, 31b of the metal plates.

In addition, even if the connector portion is carelessly touched by hand when the air is dry, static electricity that has accumulated on a human body will be discharged into the L-shaped end portions 31a, 31b. As a result, the IC 2 within the case 1 will not be electrically damaged. The aforementioned problems are thus solved.

Though an embodiment of the invention has been described, the invention is not limited thereto but can be modified in various ways without departing from the scope of the claims.

The IC card of the present invention is such that the end portions of the reinforcing metal plates affixed to the upper and lower surfaces of the case of the IC card are bent into an L-shaped configuration to cover the IC card up to the vinicity of the connector portion. As a result, the connector portion is protected against externally applied impact and is prevented from being deformed or damaged. In addition, since the reinforcing metal plates and the ground-connection point of the internal integrated circuit are connected, static electricity will be discharged into the metal plates if such a discharge should happen to occur in the proximity of the connector portion. The internal integrated circuit is thus protected against discharge.

I claim:

1. An IC card having an integrated circuit sealed within, comprising:
   a case constructed of a card-shaped synthetic resin material and internally incorporating an integrated circuit board, said case having end faces, side faces and upper and lower surfaces;
   a connector portion provided on one of said end faces of said case for connecting said integrated circuit board to an external circuit;
   a reinforcing metal plate covering each of said upper and lower surfaces of said case;
   each of said metal plates having an integral end portion bent into an L-shaped configuration to cover the peripheral portion of said one end face proximate said connector portion; and
   means electrically connecting a ground-connection point of said semiconductor integrated circuit to both of said metal plates.

2. An IC card according to claim 1 wherein said means electrically connecting said ground-connection point to both said metal plates comprises a single lead wire.

3. An IC card having an integrated circuit sealed within, comprising:
   a case constructed of a card-shaped synthetic resin material and internally incorporating an integrated circuit board, said case having a recess defined in an end thereof, and opposite surfaces;
   a connector portion disposed on said end of the case and having contact pins positioned within said recess for connecting said integrated circuit board to an external circuit; and
   a reinforcing metal plate covering each of said opposite surfaces of the case, each said metal plate further including an integral end portion bent into an L-shaped configuration toward an inlet region of said recess in covering relation to a portion of the connector portion around the inlet region of the recess, said integrated circuit board having a ground-connection point electrically connected to said reinforcing metal plates.

* * * * *

UNITED STATES PATENT AND TRADEMARK OFFICE
CERTIFICATE OF CORRECTION

PATENT NO. : 5,017,767

DATED : May 21, 1991

INVENTOR(S) : YUTAKA MIZUNO

It is certified that error appears in the above-identified patent and that said Letters Patent is hereby corrected as shown below:

Column 1, line 57, "a surface of covering" should be --covering a surface of--.

Column 2, line 22, after "of" insert --a--.

Column 3, line 7, "vinicity" should be vicinity--.

Signed and Sealed this

Fifteenth Day of December, 1992

*Attest:*

DOUGLAS B. COMER

*Attesting Officer*  *Acting Commissioner of Patents and Trademarks*